US009026436B2

(12) United States Patent
Liao

(10) Patent No.: US 9,026,436 B2
(45) Date of Patent: May 5, 2015

(54) SPEECH ENHANCEMENT METHOD USING A CUMULATIVE HISTOGRAM OF SOUND SIGNAL INTENSITIES OF A PLURALITY OF FRAMES OF A MICROPHONE ARRAY

(75) Inventor: Hsien Cheng Liao, Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 102 days.

(21) Appl. No.: 13/436,391

(22) Filed: Mar. 30, 2012

(65) Prior Publication Data

US 2013/0066626 A1 Mar. 14, 2013

(30) Foreign Application Priority Data

Sep. 14, 2011 (TW) ............................. 100132942 A

(51) Int. Cl.

*G10L 21/00* (2013.01)
*H04B 15/00* (2006.01)
*H04R 3/02* (2006.01)
*H04R 3/00* (2006.01)
*G10L 21/0208* (2013.01)
*H04R 1/40* (2006.01)

(Continued)

(52) U.S. Cl.

CPC ................ *H04R 3/005* (2013.01); *G10L 21/04* (2013.01); *G10K 11/175* (2013.01); *G10L 21/0208* (2013.01); *G10L 21/0232* (2013.01); *G10L 2021/02166* (2013.01); *H04R 1/406* (2013.01)

(58) Field of Classification Search

CPC ... G10L 21/04; G10L 21/0208; G10K 11/175
USPC .................. 704/233, 219, 270; 381/94.1, 307
See application file for complete search history.

(56) References Cited

U.S. PATENT DOCUMENTS 6,002,776 A 12/1999 Bhadkamkar et al.
6,266,633 B1 7/2001 Higgins et al.

(Continued)

FOREIGN PATENT DOCUMENTS

CN 1670823 A 9/2005
CN 1831554 9/2006

(Continued)

OTHER PUBLICATIONS

Kim, Young-Ik, and Rhee Man Kil "Sound Source Localization Based on Zero-Crossing Peak-Amplitude Coding", Proc. Internat. Conf. on Spoken Language Processing (INTERSPEECH-2004), Jeju, Korea, 2004.*

(Continued)

*Primary Examiner* — Farzad Kazeminezhad
(74) *Attorney, Agent, or Firm* — WPAT, P.C.; Anthony King

(57) ABSTRACT

A speech enhancement method is disclosed. The method includes the steps of: receiving a plurality of frames of sound signals by a microphone array; calculating an inter-aural time difference for each frequency band of each frame of the sound signals corresponding to at least one two-microphone set of the microphone array; calculating a plurality of values of cumulative histograms according to the calculated inter-aural time differences, wherein each value of the cumulative histograms is associates with a sound signal intensity of a respective frame; determining a first inter-aural time difference threshold according to the calculated value of the cumulative histograms; and filtering the plurality of frames of sound signals according to the first inter-aural time difference threshold.

26 Claims, 9 Drawing Sheets

(51) Int. Cl.

| | |
|---|---|
| *G10L 21/04* | (2013.01) |
| *G10K 11/175* | (2006.01) |
| *G10L 21/0232* | (2013.01) |
| *G10L 21/0216* | (2013.01) |

(56) References Cited

U.S. PATENT DOCUMENTS

| | | | | |
|---|---|---|---|---|
| 6,937,980 | B2 | 8/2005 | Krasny et al. | |
| 7,103,541 | B2 | 9/2006 | Attias et al. | |
| 7,197,146 | B2 | 3/2007 | Malvar et al. | |
| 7,426,464 | B2 | 9/2008 | Hui et al. | |
| 7,443,989 | B2 | 10/2008 | Choi et al. | |
| 7,533,015 | B2 | 5/2009 | Takiguchi et al. | |
| 7,619,563 | B2 | 11/2009 | Taenzer | |
| 7,783,060 | B2 | 8/2010 | Brooks et al. | |
| 7,881,480 | B2 | 2/2011 | Buck et al. | |
| 2005/0143989 | A1 | 6/2005 | Jelinek | |
| 2009/0264961 | A1* | 10/2009 | Schleich et al. | 607/57 |
| 2009/0304203 | A1* | 12/2009 | Haykin et al. | 381/94.1 |
| 2011/0182437 | A1* | 7/2011 | Kim et al. | 381/73.1 |
| 2012/0148069 | A1* | 6/2012 | Bai et al. | 381/94.1 |

FOREIGN PATENT DOCUMENTS

| | | | |
|---|---|---|---|
| CN | 1967658 | A | 5/2007 |
| CN | 101192411 | A | 6/2008 |
| CN | 101779476 | A | 7/2010 |
| CN | 101903948 | | 12/2010 |
| CN | 102142259 | | 8/2011 |
| TW | 200921645 | A | 5/2009 |
| TW | 200926150 | A | 6/2009 |
| TW | 201030733 | A | 8/2010 |
| WO | 2010091077 | | 8/2010 |

OTHER PUBLICATIONS

"Harmonic sound stream segregation using localization and its application to speech stream segregation", Tomohiro Nakatani, Hiroshi G. Okuno, Speech Communications 27 (1999) 209-222.*

Chanwoo Kim et al., Signal Separation for Robust Speech Recognition Based on Phase Difference Information Obtained in The Frequency Domain.

Chanwoo Kim et al., Automatic Selection of Thresholds for Signal Separation Algorithms Based on Interaural Delay.

Office Action issued on Mar. 21, 2014 for the Chinese counterpart application 201210008319.X.

Cobos, Maximo et al., Two-Microphone separation of speech mixtures based on interclass variance maximization, Acoustical Society of America, pp. 1661-1672.

Office Action issued on Dec. 12, 2013 for the Taiwanese counterpart application 100132942.

* cited by examiner

SPEECH ENHANCEMENT METHOD USING A CUMULATIVE HISTOGRAM OF SOUND SIGNAL INTENSITIES OF A PLURALITY OF FRAMES OF A MICROPHONE ARRAY

TECHNICAL FIELD

The disclosure relates to a speech enhancement method and system thereof.

BACKGROUND

Speech enhancement technology can filter noise from received speech signals in order to enhance the speech signals. Speech enhancement technology can be applied to oral communication, voice user interface, voice input, and other applications. Currently, with rapid development of mobile devices, vehicle electronic devices, and robots, the requirements of oral communication, voice input, and human-machine voice user interface in the noisy environment are quickly increasing. Thus, the issues of how to filter noise, enhance speech signal, and increase the quality of oral communication and human-machine voice user interface has become more and more important.

Generally, the speech signals received from microphones include signals from voice sources and noise sources. Since noise sources decrease the quality of oral communication and human-machine voice user interface, it is essential to reduce noise in order to increase signal quality. Although traditional speech enhancement technology with a single microphone utilizes filters, adaptive filters, and statistical models to enhance signal quality, the efficiency of such technology is limited. In addition, although the speech enhancement system with multiple microphones has better efficiency than the speech enhancement system with a single microphone, the speech enhancement system with multiple microphones requires too much computation load to apply for mobile devices with limited computation capability.

SUMMARY

The present disclosure provides a speech enhancement method that includes the steps of: utilizing a two-microphone set of a microphone array to receive a plurality of frames of sound signals; calculating an inter-aural time difference for each frequency band of each frame of the sound signals in accordance with the two-microphone set of the microphone array; calculating a plurality of values of a cumulative histogram in accordance with the calculated inter-aural time differences; determining a first inter-aural time difference threshold in accordance with the values of the cumulative histogram; and filtering a plurality of the frames of the sound signals in accordance with the first inter-aural time difference threshold.

The present disclosure provides a speech enhancement system comprising a microphone module, an inter-aural time difference calculating module, a cumulative histogram module, a first inter-aural time difference threshold calculating module, and a sound signal filtering module. The microphone module has at least one two-microphone set of a microphone array. The inter-aural time difference calculating module calculates an inter-aural time difference for each frequency band of each frame of sound signals in accordance with the two-microphone set of the microphone array. The cumulative histogram module calculates a plurality of values of a cumulative histogram in accordance with an inter-aural time difference for each frame. The first inter-aural time difference threshold calculating module calculates the first inter-aural time difference threshold in accordance with the values of the cumulative histogram. The sound signal filtering module filters the sound signals in accordance with the first inter-aural time difference threshold.

The present disclosure also provides a speech enhancement method comprising the following steps: utilizing a two-microphone set of a microphone array to receive a plurality of frames of sound signals; calculating an inter-aural time difference for each frequency band of each frame of the sound signals in accordance with the two-microphone set of the microphone array; calculating a plurality of values of a cumulative histogram and a histogram in accordance with the calculated inter-aural time differences; determining a first inter-aural time difference threshold in accordance with the values of the cumulative histogram; determining a second inter-aural time difference threshold in accordance with the values of the histogram and the first inter-aural time difference threshold; and filtering the frames of the sound signals in accordance with the first inter-aural time difference threshold and the second inter-aural time difference threshold, wherein the second inter-aural time difference threshold is greater than the first inter-aural time difference threshold.

The present disclosure also provides a speech enhancement system comprising a microphone module, an inter-aural time difference calculating module, a cumulative histogram module, a first inter-aural time difference threshold calculating module, a second inter-aural time difference threshold calculating module, and an sound signal filtering module. The microphone module has at least one two-microphone set of a microphone array. The inter-aural time difference calculating module calculates an inter-aural time difference for each frequency band of each frame of sound signals in accordance with the two-microphone set of the microphone array. The cumulative histogram module calculates a plurality of values of a cumulative histogram in accordance with an inter-aural time difference for each frame. The first inter-aural time difference threshold calculating module calculates the first inter-aural time difference threshold in accordance with the values of the cumulative histogram. The second inter-aural time difference threshold calculating module calculates the second inter-aural time difference threshold in accordance with the values of the histogram and the first inter-aural time difference threshold. The sound signal filtering module filters the sound signals in accordance with the first inter-aural time difference threshold and the second inter-aural time difference threshold.

The foregoing has outlined rather broadly the features and technical benefits of the disclosure in order that the detailed description of the invention that follows may be better understood. Additional features and benefits of the invention will be described hereinafter, and form the subject of the claims of the invention. It should be appreciated by those skilled in the art that the conception and specific embodiment disclosed may be readily utilized as a basis for modifying or designing other structures or processes for carrying out the same purposes of the disclosure. It should also be realized by those skilled in the art that such equivalent constructions do not depart from the spirit and scope of the invention as set forth in the appended claims.

BRIEF DESCRIPTION OF THE DRAWINGS

The accompanying drawings, which are incorporated in and constitute a part of this specification, illustrate embodiments of the disclosure and, together with the description, serve to explain the principles of the invention.

DETAILED DESCRIPTION

In the following description, numerous specific details are set forth. However, it should be understood that embodiments of the disclosure may be practiced without these specific details. In other instances, well-known methods, structures and techniques have not been shown in detail in order not to obscure an understanding of this description. References to “the embodiment,” “an embodiment,” “another embodiment,” “other embodiment,” etc. indicate that the embodiment(s) of the disclosure so described may include a particular feature, structure, or characteristic, but not every embodiment necessarily includes the particular feature, structure, or characteristic. Further, repeated use of the phrase “in the embodiment” does not necessarily refer to the same embodiment, although it may. Unless specifically stated otherwise, as apparent from the following discussions, it should be appreciated that, throughout the specification, discussions utilizing terms such as “searching,” “filtering,” “calculating,” “determining,” “implementing,” “removing,” “attenuating,” “generating,” or the like refer to the action and/or processes of a computer or computing system, or similar electronic computing device, state machine and the like that manipulate and/or transform data represented as physical, such as electronic, quantities, into other data similarly represented as physical quantities.

The present disclosure is directed to a speech enhancement method and a system thereof. In order to make the present disclosure completely comprehensible, detailed steps and structures are provided in the following description. Obviously, implementation of the present disclosure does not limit special details known by persons skilled in the art. In addition, known structures and steps are not described in details, so as not to limit the present disclosure unnecessarily. Preferred embodiments of the present disclosure will be described below in detail. However, in addition to the detailed description, the present disclosure may also be widely implemented in other embodiments. The scope of the present disclosure is not limited to the detailed description, and is defined by the claims.

Figure 1:
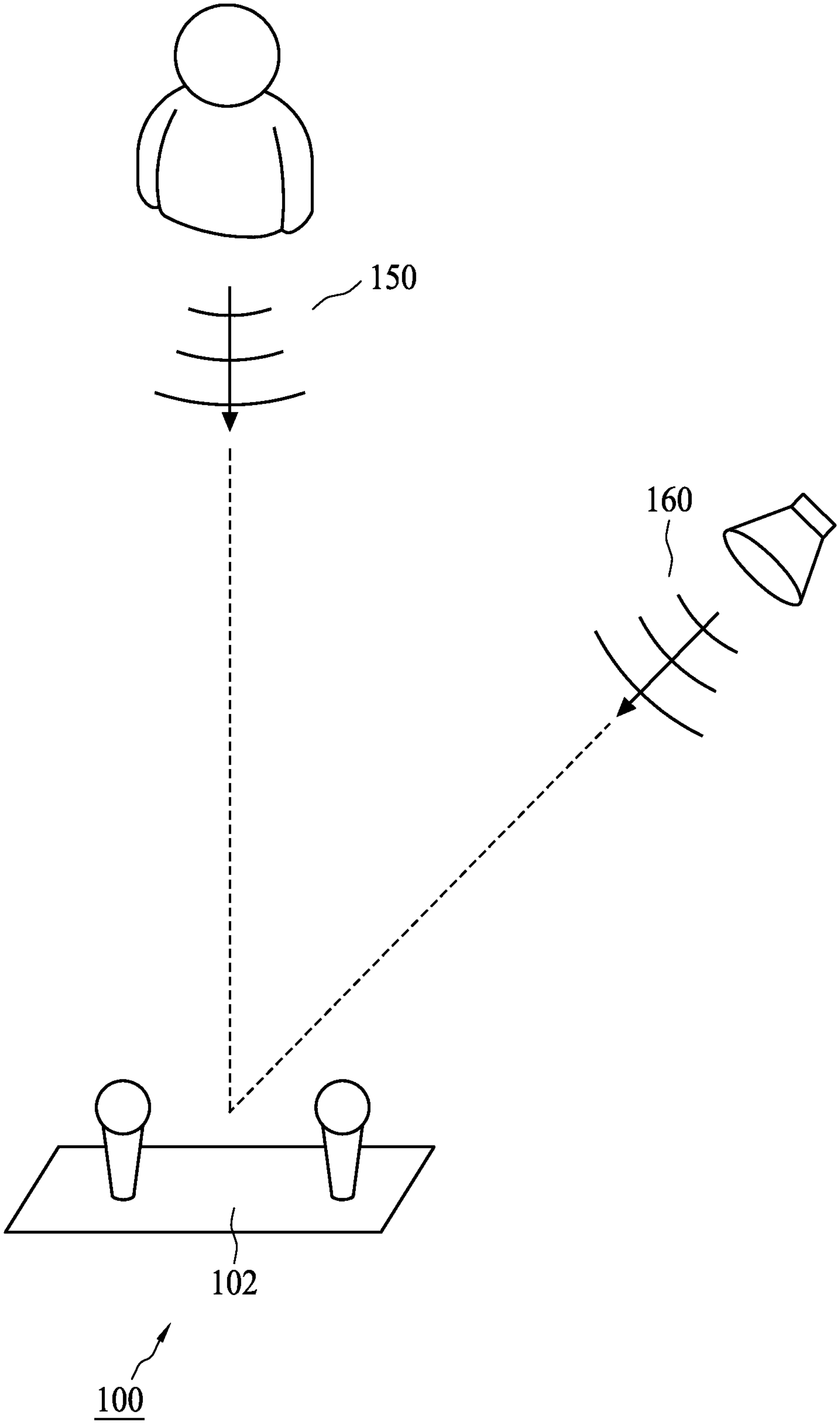
FIG. 1 illustrates a schematic view of a speech enhancement system in accordance with one embodiment of the present disclosure.

In an embodiment of the present disclosure of a speech enhancement system shown in FIG. 1, the speech enhancement system 100 is utilized to receive sound signals from a voice source 150 facing the speech enhancement system 100 and includes a two-microphone set of a microphone array 102. However, the microphone array 102 simultaneously receives sound signals from a noise source 160. Since the speech enhancement system 100 is disposed opposite to the voice source 150, the time intervals from the voice source 150 to each microphone are the same. In contrast, since the speech enhancement system 100 and the noise source 160 form an included angle, the time intervals from the noise source 160 to each microphone of the microphone array 102 will be different. Thus, the difference between the time intervals can be defined as an inter-aural time difference. The speech enhancement method of the present disclosure can filter the sound signal of the noise source 160 though the calculation of the inter-aural time difference.

Figure 2:
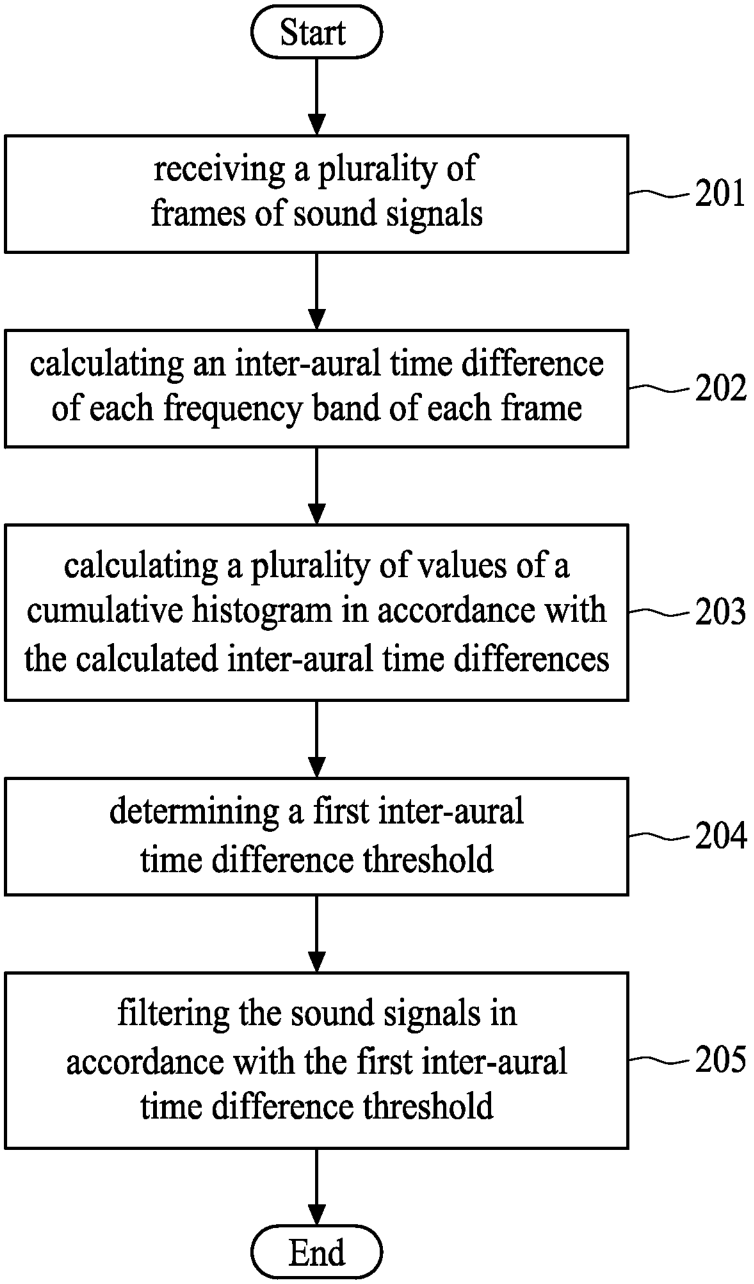
FIG. 2 illustrates a flow chart of a speech enhancement method in accordance with one embodiment of the present disclosure.

FIG. 2 illustrates a flow chart of a speech enhancement method in accordance with an embodiment of the present disclosure. In Step 201, a two-microphone set of a microphone array receives a plurality of frames of sound signals, and then Step 202 is implemented. In Step 202, an inter-aural time difference for each frequency band of each frame of the sound signals is calculated in accordance with the two-microphone set of a microphone array, and then Step 203 is implemented. In Step 203, a plurality of values of the cumulative histogram are calculated in accordance with the calculated inter-aural time differences, and then Step 204 is implemented. In Step 204, a first inter-aural time difference threshold is determined in accordance with the values of the cumulative histogram, and then Step 205 is implemented. In Step 205, a plurality of the frames of the sound signals are filtered in accordance with the first inter-aural time difference threshold.

Referring to FIGS. 1 and 2, in addition to the microphone array 102 and microphone sets, the speech enhancement system 100 further includes an inter-aural time difference calculating module, a cumulative histogram module, a first inter-aural time difference threshold calculating module, and an sound signal filtering module. The inter-aural time difference calculating module as shown in Step 202 can be utilized to calculate an inter-aural time difference for each frequency band of each frame of sound signals in accordance with the two-microphone set of the microphone array 102. The cumulative histogram module, as shown in Step 203, calculates a plurality of values of a cumulative histogram in accordance with an inter-aural time difference for each frame. The first inter-aural time difference threshold calculating module, as shown in Step 204, determines the first inter-aural time difference threshold in accordance with the values of the cumulative histogram. The sound signal filtering module, as shown in Step 205, filters the sound signals in accordance with the first inter-aural time difference threshold.

Figure 3:
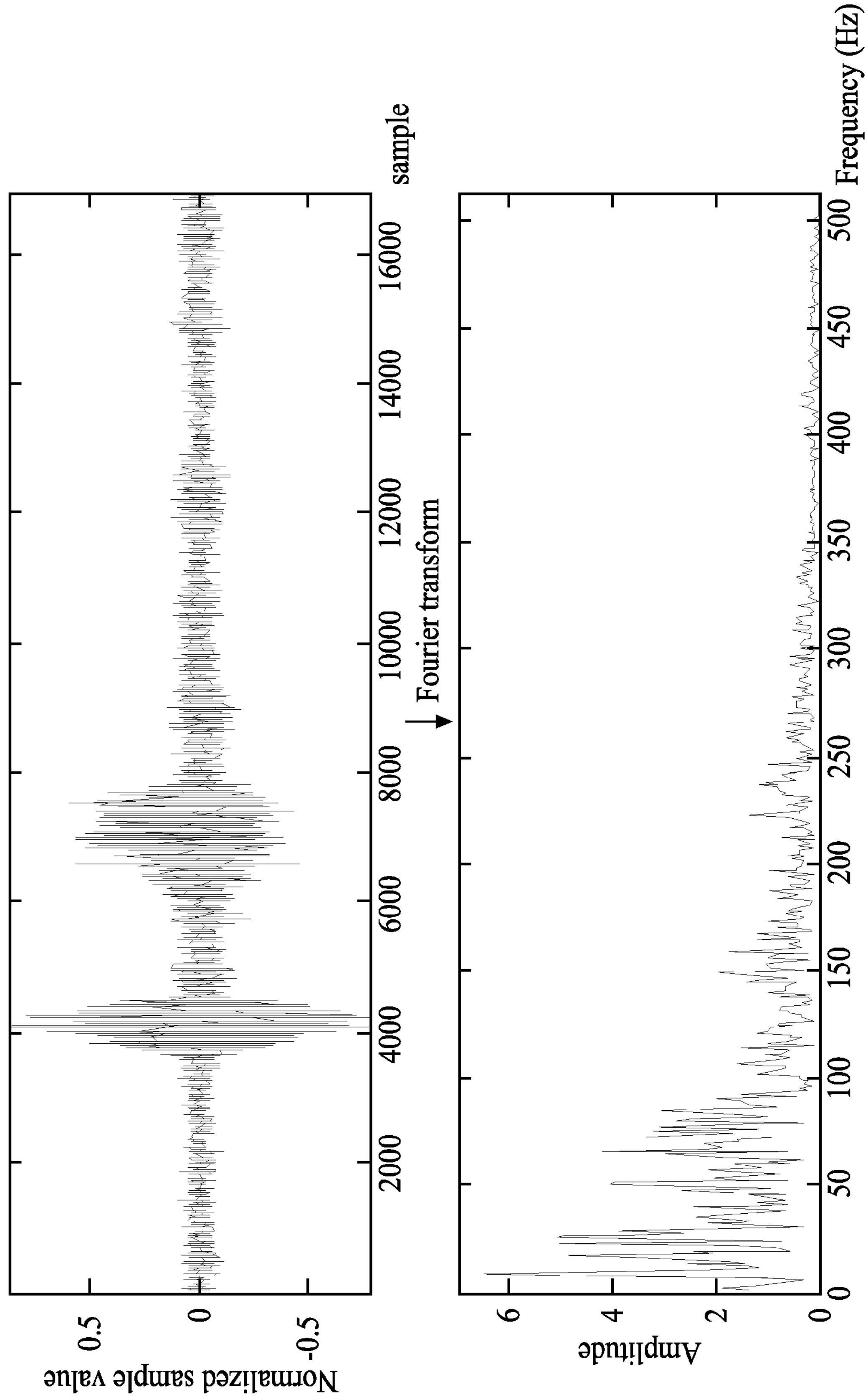
FIG. 3 illustrates schematic views of a time domain and a frequency domain of a sound signal in accordance with one embodiment of the present disclosure.

The speech enhancement system shown in FIG. 1 and the speech enhancement method shown in FIG. 2 are illustrated with the following description. In Step 201, the two-microphone set of the microphone array 102 receives a plurality of frames of sound signal, which includes signals from the voice source 150 and from the noise source 160. In Step 202, the inter-aural time difference for each frequency band of each frame of the sound signals is calculated in accordance with the two-microphone set of the microphone array. FIG. 3 illustrates one frame of the sound signal received from one microphone of the microphone array 102 and a frequency domain of the sound signals generated by the frame of the sound signal through discrete Fourier transformation. The frequency domains of the sound signals of the frequency band $k_0$ (e.g., at $k_0$ point) and the frame $m_0$ received by two microphones (left and right) of the microphone array 102 can be defined as $X_L(k_0;m_0)$ and $X_R(k_0;m_0)$, respectively. In addition, the inter-aural time difference $|d(k_0,m_0)|$ of the frequency band $k_0$ (e.g., at $k_0$ point) and the frame $m_0$ can be calculated by the following formula $$|d(k_0, m_0)| \approx \frac{1}{|\omega_{k_0}|}\min_r |\angle X_R(k_0, m_0) - \angle X_L(k_0, m_0) - 2\pi r|,$$

wherein $\angle X_R(k_0,m_0)$ and $\angle X_R(k_0,m_0)$ mean phase values of $X_R(k_0;m_0)$ and $X_L(k_0;m_0)$, respectively; $2\pi r$ is compensation item to control the phase of $\angle X_R(k_0,m_0)$ and $\angle X_R(k_0,m_0)$ to range between 0 and $2\pi$; $\omega_{k_0}$ is angular velocity.

Figure 4:
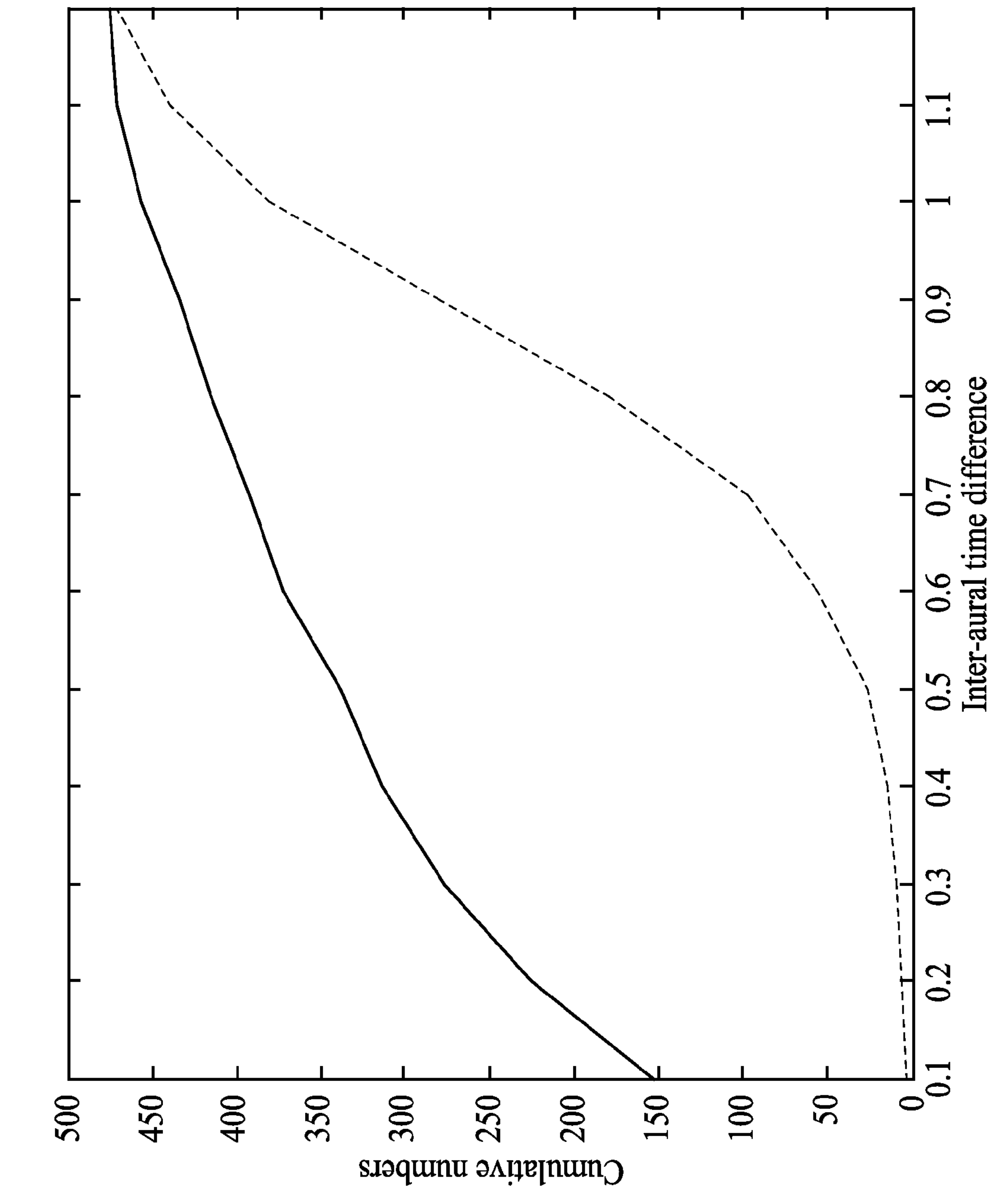
FIG. 4 illustrates a schematic view of a cumulative histogram of calculated the inter-aural time difference in accordance with one embodiment of the present disclosure.

Step 203 calculates a plurality of values of a cumulative histogram in accordance with the calculated inter-aural time difference. FIG. 4 illustrates the values of the cumulative histogram in accordance with the inter-aural time difference of two frames. The dotted line in the cumulative histogram shows the sound signal from the frame of the noise source 160. In contrast, the solid line in the cumulative histogram shows the sound signals from both the voice source 150 and the noise source 160. As shown in FIG. 4, since the histogram illustrated by the dotted line does not include the sound signal from the voice source 150, the proportion of zero inter-aural time difference in the dotted line curve is smaller than the proportion of zero inter-aural time difference in the solid line curve, which includes the sound signals from the voice source 150.

Figure 5:
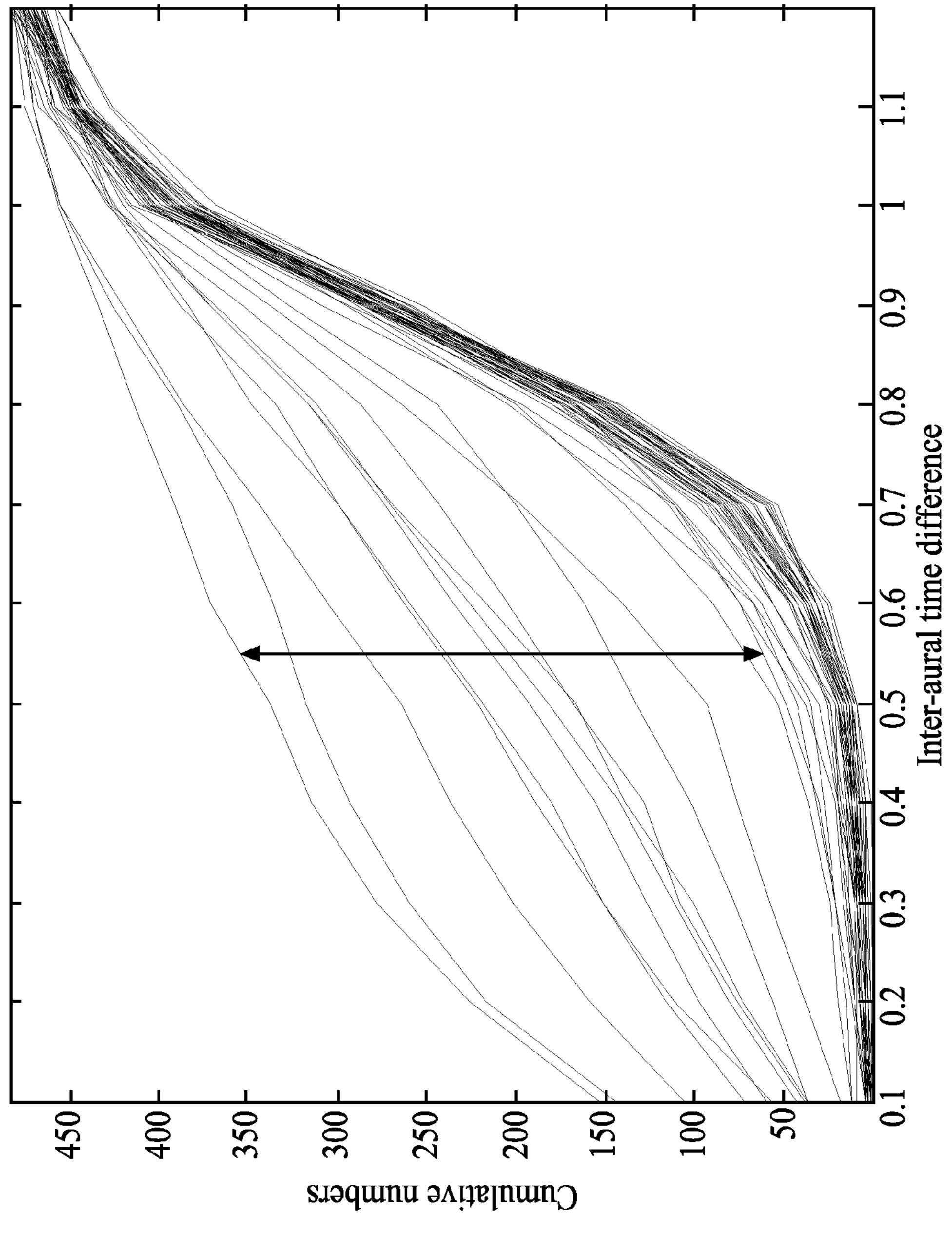
FIG. 5 illustrates a schematic view of a cumulative histogram of calculated inter-aural time difference in accordance with another embodiment of the present disclosure.

Step 204 determines a first inter-aural time difference threshold in accordance with the values of the cumulative histogram. FIG. 5 illustrates a cumulative histogram including a plurality of inter-aural time differences of a plurality of frames. In the embodiment of the present disclosure, variance is calculated in accordance with different inter-aural time differences of the frames in the cumulative histogram, and a first inter-aural time difference threshold is determined in accordance with the maximum of the variance. As shown in FIG. 5, since the inter-aural time differences indicated by arrows have the maximum variance, the value of the indicated inter-aural time difference is regarded as the first inter-aural time difference threshold.

Step 205 filters a plurality of frames of the sound signal in accordance with the first inter-aural time difference threshold. The embodiment of the present disclosure searches for a plurality of frequency bands whose inter-aural time difference is greater than the first inter-aural time difference threshold and then removes the frequency bands from each frame of the sound signals.

In the embodiment of the present disclosure, Step 205 is implemented by the following formula:

$$\gamma(k_0, m_0) = \begin{cases} 1, & \text{if } |d(k_0, m_0)| \le \tau_1 \\ \eta, & \text{if } |d(k_0, m_0)| > \tau_1, \end{cases}$$

wherein $\gamma(k_0,m_0)$ is a weighting value of frequency band $k_0$ in the frame $m_0$ of the sound signals; $d(k_0,m_0)$ is an inter-aural time difference of frequency band $k_0$ in the frame $m_0$ of the sound signals; $\tau_1$ is the first inter-aural time difference threshold; and $\eta$ is a minimum variable. In the embodiment of the present invention, $\eta$ is 0.01. In the embodiment of the present invention, Step 205 can be implemented by the following formula:

$$\gamma(k_0, m_0) = \frac{1}{1 + e^{\beta(d(k_0, m_0) - \tau_1)}},$$

wherein $\gamma(k_0,m_0)$ is a weighting value of frequency band $k_0$ in the frame $m_0$ of the sound signals; $d(k_0,m_0)$ is an inter-aural time difference of frequency band $k_0$ in the frame $m_0$ of the sound signals; $\tau_1$ is the first inter-aural time difference threshold; and $\beta$ is a variable to control the filtering degree. A greater value of $\beta$ correlates to more sound signals being filtered.

As shown in the above-mentioned formulas, Step 205 will preserve the frequency bands whose inter-aural time difference are smaller than the first inter-aural time difference threshold, and Step 205 will filter the frequency bands whose inter-aural time difference is greater than the first inter-aural time difference threshold. In addition, the embodiment of the present disclosure utilizes the variance of the values of the cumulative histogram with different frames to determine the first inter-aural time difference threshold. The variance calculating step further includes a step of calculating an updated variance in a recurrence calculation based on the previous variance. Therefore, the speech enhancement method of the present disclosure can preserve previous frames of sound signals into hardware to reduce computation load. In other words, the present disclosure can preserve a previous variance and receive a new sound signal to update the first inter-aural time difference threshold.

The speech enhancement method shown in FIG. 2 can utilize the inter-aural time difference of the sound signal received by the speech enhancement system 100 and can filter the sound signals from different voice sources with different included angles with the speech enhancement system 100 in a different filtering degree. In other words, the speech enhancement method shown in FIG. 2 defines the region whose inter-aural time difference smaller than the first inter-aural time difference threshold as a main region and defines the region whose inter-aural time difference is greater than the first inter-aural time difference threshold as a filtering region. The embodiment of the present disclosure further defines a minor region ranging between the main region and the filtering region. Thus, the filtering degree ranges between the main region and the filtering region.

Figure 6:
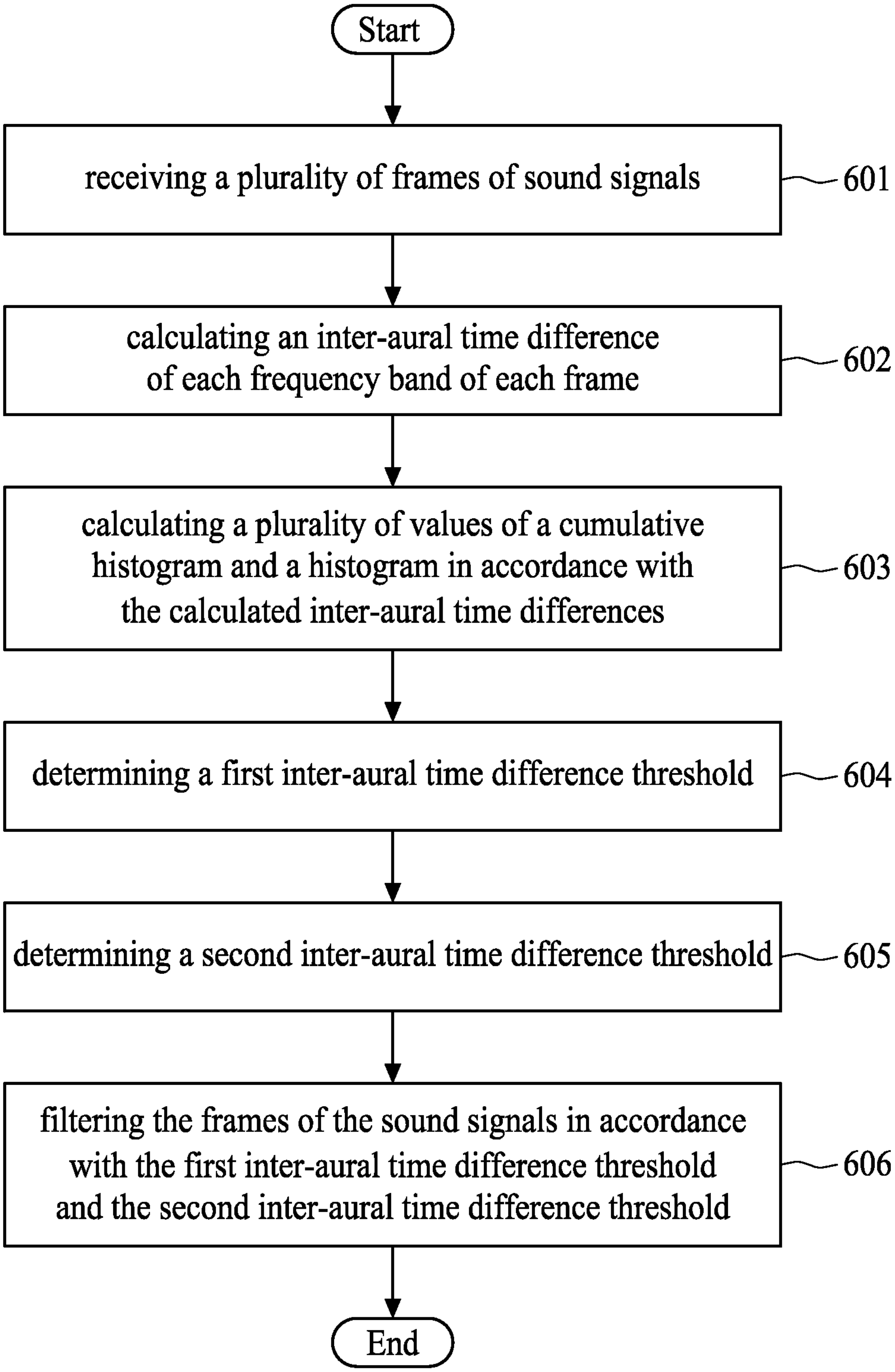
FIG. 6 illustrates a flow chart of a speech enhancement method in accordance with another embodiment of the present disclosure.

FIG. 6 illustrates a flow chart of a speech enhancement method in accordance with another embodiment of the present disclosure. In Step 601, a two-microphone set of a microphone array is utilized to receive a plurality of frames of sound signals, and then Step 602 is implemented. In Step 602, an inter-aural time difference for each frequency band of each frame of the sound signals is calculated in accordance with the two-microphone set of the microphone array, and then Step 603 is implemented. In Step 603, a plurality of values of a cumulative histogram and a histogram are calculated in accordance with the calculated inter-aural time differences for each frame of sound signals, and then Step 604 is implemented. In Step 604, a first inter-aural time difference threshold is determined in accordance with the values of the cumulative histogram and then Step 605 is implemented. In Step 605, a second inter-aural time difference threshold is determined in accordance with the values of the histogram and the first inter-aural time difference threshold, and then Step 606 is implemented. In Step 606, the frames of the sound signals are filtered in accordance with the first inter-aural time difference threshold and the second inter-aural time difference threshold.

Referring FIG. 1, the speech enhancement system incorporated with the speech enhancement method of FIG. 6, in addition to the microphone module including at least one two-microphone set of a microphone array, further includes an inter-aural time difference calculating module, a cumulative histogram module, a first inter-aural time difference threshold calculating module, a second inter-aural time difference threshold calculating module, and an sound signal filtering module. The inter-aural time difference calculating module, as shown in Step 602, calculates an inter-aural time difference for each frequency band of each frame of sound signals in accordance with the two-microphone set of the microphone array. The cumulative histogram module, as shown in Step 603, calculates a plurality of values of a cumulative histogram and a histogram in accordance with an inter-aural time difference for each frame. The first inter-aural time difference threshold calculating module, as shown in Step 604, calculates the first inter-aural time difference threshold in accordance with the values of the cumulative histogram. The second inter-aural time difference threshold calculating module, as shown in Step 605, calculates the second inter-aural time difference threshold in accordance with the values of the histogram and the first inter-aural time difference threshold. The sound signal filtering module, as shown in Step 606, filters the sound signals in accordance with the first inter-aural time difference threshold and the second inter-aural time difference threshold.

Figure 7:
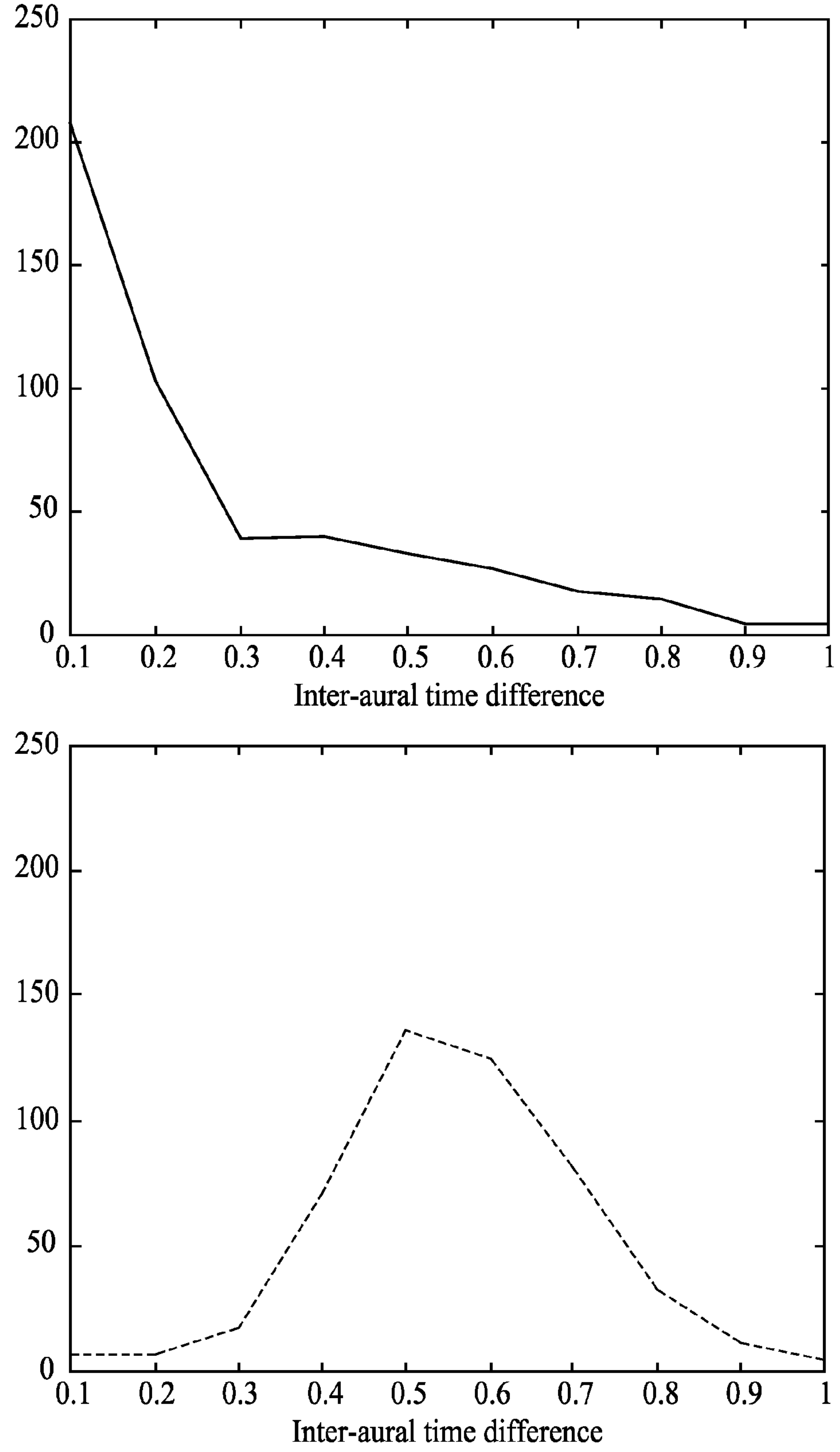
FIG. 7 illustrates a schematic view of a histogram of calculated inter-aural time difference in accordance with one embodiment of the present disclosure.

Comparing the speech enhancement methods of FIG. 2 and FIG. 6, the speech enhancement method of FIG. 6 further includes a step of calculating a second inter-aural time difference threshold and filters the sound signals in accordance with the first inter-aural time difference threshold and the second inter-aural time difference threshold. The speech enhancement system of FIG. 1 and the speech enhancement method of FIG. 6 are described as follows. Since Steps 601 and 602 are similar to Steps 201 and 202, the redundant description is not repeated. In Step 603, a plurality of values of a cumulative histogram and a histogram are calculated in accordance with the calculated inter-aural time difference for each frame of the sound signal. FIG. 7 shows two histograms of inter-aural time differences with different frames. The dotted line of the histogram shows the sound signal from the frame of the noise source 160. In contrast, the solid line of the histogram shows the sound signals from both the voice source 150 and the noise source 160. As shown in FIG. 7, since the histogram illustrated by the dotted line does not include the sound signal from the voice source 150, the proportion of zero inter-aural time difference in the dotted line curve is smaller than the proportion of zero inter-aural time difference in the solid line curve, which includes the sound signals from the voice source 150. In addition, since Step 604 is similar to Step 204, the redundant description is not repeated.

Figure 8:
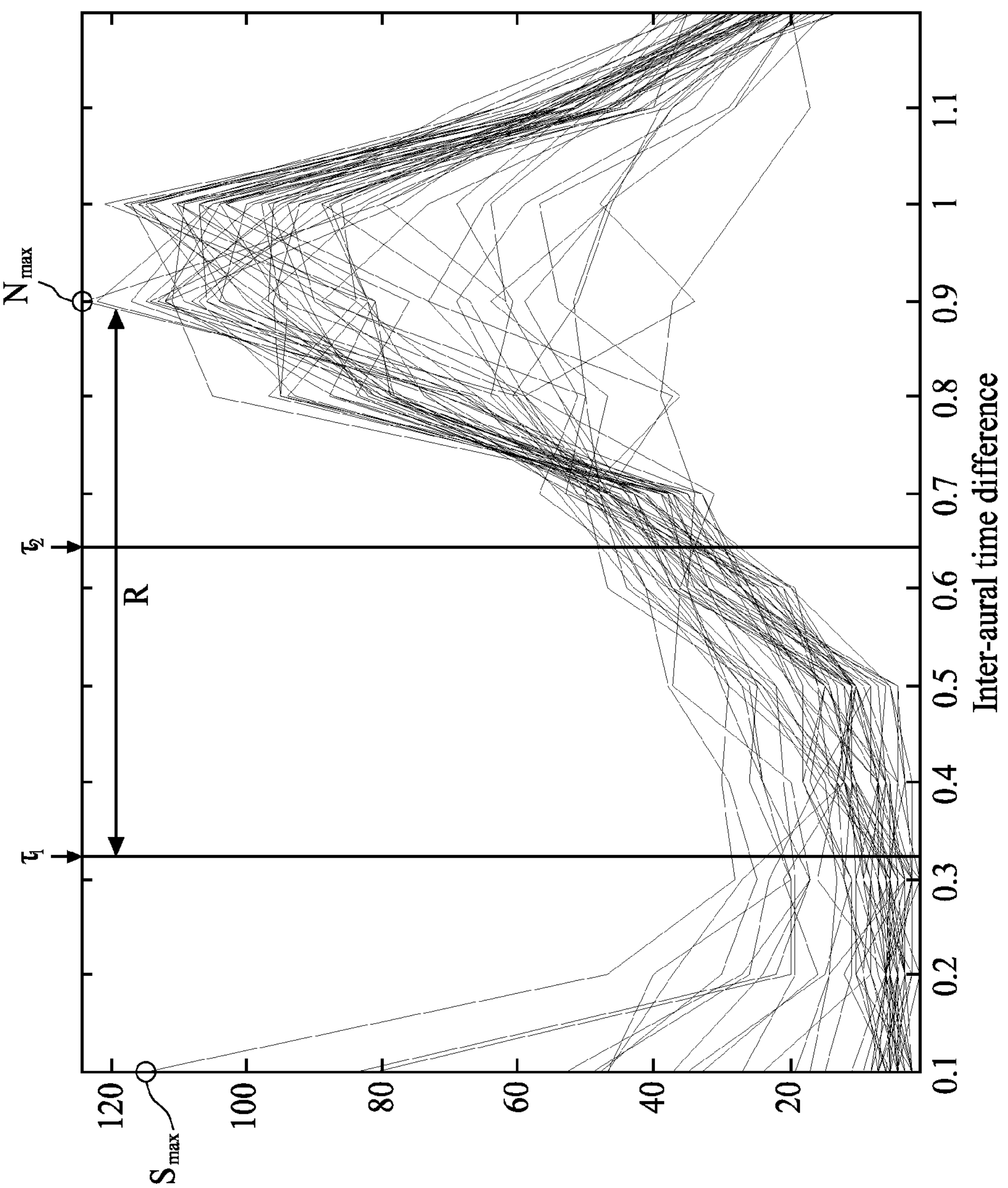
FIG. 8 illustrates a schematic view of a histogram of calculated inter-aural time difference in accordance with another embodiment of the present disclosure.

Step 605 determines a second inter-aural time difference threshold in accordance with the values of the histogram and the first inter-aural time difference threshold. FIG. 8 illustrates the histogram of the inter-aural time difference of a plurality of frames. In the embodiment of the present disclosure, after calculating a signal to noise ratio of the voice source 150 and the noise source 160 in accordance with the values of the histogram, the second inter-aural time difference threshold is determined in accordance with the signal to noise ratio of the voice source 150 and the noise source 160, the inter-aural time difference of the noise source 160, and the first inter-aural time difference threshold. As shown in FIG. 8, in the embodiment of the present disclosure, the maximum value of the histogram whose inter-aural time difference is smaller than the first inter-aural time difference threshold is defined as signal intensity $S_{max}$ of the voice source 150. The maximum value of the histogram whose inter-aural time difference is greater than the first inter-aural time difference threshold is defined as signal intensity $N_{max}$ of the noise source 160. By doing so, the histogram of FIG. 8 can calculate the signal to noise ratio $S_{max}/N_{max}$ of a voice source 150 and a noise source 160 in accordance with the values of the histogram.

In the embodiment of the present disclosure, the second inter-aural time difference threshold is calculated by the following formula:

$$\tau_2=\tau_1+\delta+R\times\mathrm{SNR},$$

wherein $\tau_1$ is the first inter-aural time difference threshold; $\tau_2$ is the second inter-aural time difference threshold; R means that the inter-aural time difference of the noise source 160 is reduced by subtracting the first inter-aural time difference threshold; SNR is the signal to noise ratio between the voice source 150 and the noise source 160; and δ is a minimum angle variable. In the embodiment of the present disclosure, δ is 0.1. Referring to FIG. 8, if SNR is approximately 0.5, the second inter-aural time difference threshold ranges between the first inter-aural time difference threshold and the inter-aural time difference of the noise source 160.

In another embodiment of the present disclosure, the second inter-aural time difference threshold is calculated by the following formula:

$$\tau_2 = \tau_1 + \delta + R \times \frac{1}{1 + e^{-\beta(SNR-1)}},$$

wherein $\tau_1$ is the first inter-aural time difference threshold; $\tau_2$ is the second inter-aural time difference threshold; R means that the inter-aural time difference of the noise source 160 is reduced by subtracting the first inter-aural time difference threshold; SNR is the signal to noise ratio between the voice source 150 and the noise source 160; β is a variable to control the filtering degree; and δ is a minimum angle variable. In the embodiment of the present disclosure, δ is 0.1. If SNR of the voice source 150 and the noise source 160 is greater than 0.5, the minor region will be enlarged. In contrast, if SNR of the voice source 150 and the noise source 160 is less than 0.5, the minor region will be reduced.

Step 606 filters the frames of the sound signals in accordance with the first inter-aural time difference threshold and the second inter-aural time difference threshold. In the embodiment of present disclosure, the sound signals filtering step further includes the steps of: searching for a plurality of frequency bands whose inter-aural time differences are greater than the second inter-aural time difference threshold; removing the frequency bands whose inter-aural time difference is greater than the second inter-aural time difference threshold; searching for a plurality of frequency bands whose inter-aural time differences are between the second inter-aural time difference threshold and the first inter-aural time difference threshold; and attenuating the frequency bands whose inter-aural time difference is between the second inter-aural time difference threshold and the first inter-aural time difference threshold. In other words, after the frequency bands having inter-aural time differences greater than the second inter-aural time difference threshold are removed from the sound signals, the sound signals attenuating the frequency bands having inter-aural time differences between the second inter-aural time difference threshold and the first inter-aural time difference threshold are defined as speech enhancement signal. In the embodiment of the present disclosure, Step 606 (including the step of removing frequency bands and the step of attenuating frequency bands) is implemented by the following formula:

$$\gamma(k_0, m_0) = \begin{cases} 1, & \text{if } |d(k_0, m_0)| \le \tau_1 \\ \alpha, & \text{if } |d(k_0, m_0)| > \tau_1 \text{ and } |d(k_0, m_0)| \le \tau_2 \\ \eta, & \text{otherwise,} \end{cases}$$

wherein $\gamma(k_0,m_0)$ is a weighting value of frequency band $k_0$ in the frame $m_0$ of the sound signals; $d(k_0,m_0)$ is an inter-aural time difference of frequency band $k_0$ in the frame $m_0$ of the sound signals; $\tau_1$ is the first inter-aural time difference threshold; $\tau_2$ is the second inter-aural time difference threshold; $\alpha$ is a variable between 0 and 1 to control the filtering degree; and $\eta$ is a minimum variable. In the embodiment of the present disclosure, $\eta$ is 0.01.

Based on the above-method steps, the present disclosure preserves the frequency bands of the main region, attenuates the frequency bands of the minor region, and removes the frequency bands of the filtering region to obtain the speech enhancement signal. In the embodiment of the present disclosure, $\alpha$ and the signal to noise ratio between the voice source and the noise source are in direct proportion. In addition, $\alpha$ is calculated by the following formula:

$$\alpha = \frac{1}{1 + e^{-\beta(SNR-1)}},$$

wherein SNR is the signal to noise ratio between the voice source 150 and the noise source 160 and can be determined by $S_{max}/N_{max}$; and $\beta$ is a variable to control the filtering degree. A greater value of $\beta$ corresponds to a higher filtering degree.

Referring to the speech enhancement system 100 of FIG. 1, if the voice source 150 does not face toward the microphone array 102, the system 100 should add a compensation item to calculate the inter-aural time difference to simulate the voice source 150 facing toward the microphone array 102. Since those ordinarily skilled in the art can practice the present disclosure without undue experiment, the description of the compensation item is not described.

Figure 9:
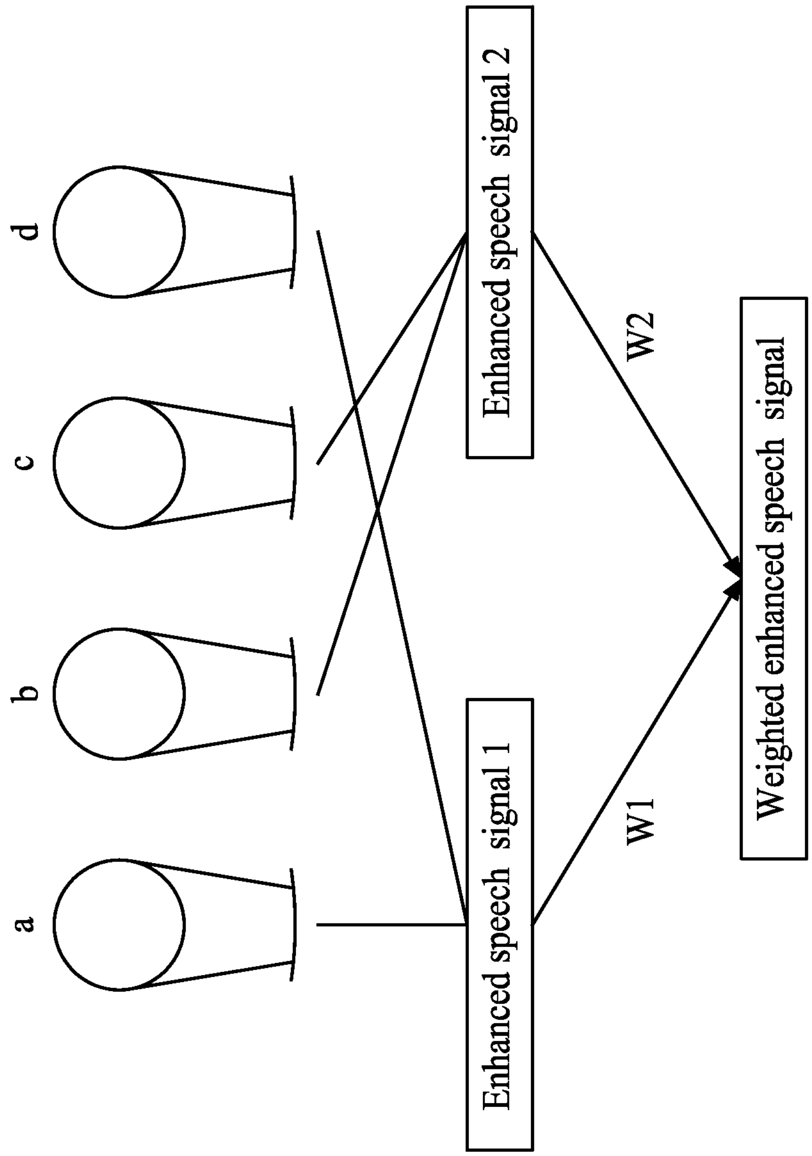
FIG. 9 illustrates a schematic view of a speech enhancement system, showing the speech enhancement signals and the weighted speech enhancement signal, in accordance with another embodiment of the present disclosure.

As shown in FIG. 1, the two-microphone set of the microphone array 102 of the speech enhancement system 100 includes two microphones. However, the speech enhancement system 100 is not limited to a single two-microphone set of the microphone array. The speech enhancement system 100 include a weighting module, which can weight the speech enhancement signals obtained by the above-mentioned embodiments through predetermined weighting factors such as W1 and W2, shown in FIG. 9. FIG. 9 shows a microphone array of four microphones. Microphone a and microphone d can receive sound signals and then the signals are enhanced by the speech enhancement method shown in FIG. 6 to obtain an enhanced speech signal 1; meanwhile, microphone b and microphone c can receive sound signals and then the signals are enhanced by the speech enhancement method shown in FIG. 6 to obtain an enhanced speech signal 2. The enhanced speech signal 1 (ESS1) and the enhanced speech signal 2 (ESS2) can be calculated by the following formula:

$$\text{Enhanced Speech Signal} = \frac{W1 \times (ESS1) + W2 \times (ESS2)}{W1 + W2},$$

wherein W1 and W2 are weighting factors of the enhanced speech signal 1 and the enhanced speech signal 2, respectively. As shown in FIG. 9, the speech enhancement system includes four microphones, two of which can be selected to form a two-microphone set, which is implemented by the above-mentioned speech enhancement method to obtain the weighted enhanced speech signal. Similarly, in another embodiment (not shown), a speech enhancement system including three microphones x, y, and z can be implemented by the above-mentioned speech enhancement method. In particular, the enhanced speech signals from microphones x and y, microphones y and z, and microphones x and z can be respectively weighted to obtain the weighted enhanced speech signals.

In summary, the speech enhancement method of the present disclosure utilizes the values of the cumulative histogram of the inter-aural time difference to determine a main region and a filtering region and filters the received sound signals in accordance with different filtering degrees. In addition, the speech enhancement method of the present disclosure can utilize a simple microphone array and a smaller computation load to obtain the speech enhancement signals.

The above-described embodiments of the present disclosure are intended to be illustrative only. Numerous alternative embodiments may be to devised by persons skilled in the art without departing from the scope of the following claims. Those skilled in the art may devise numerous alternative embodiments without departing from the scope of the following claims.

What is claimed is:

1. A speech enhancement method, comprising the following steps:

utilizing a two-microphone set of a microphone array to receive a plurality of frames of sound signals;

calculating an inter-aural time difference for each frequency band of each frame of the sound signals in accordance with the two-microphone set of the microphone array;

calculating a plurality of values of a cumulative histogram in accordance with the calculated inter-aural time differences, wherein each value of the cumulative histogram is associated with a sound signal intensity of a respective frame dependent on the inter-aural time difference of that frame, wherein variances in the cumulative histogram are calculated in accordance with different inter-aural time differences;

determining a first inter-aural time difference threshold in accordance with the values of the cumulative histogram, wherein the first inter-aural time difference threshold is determined in accordance with a maximum of the variances;

and filtering a plurality of the frames of the sound signals in accordance with the first inter-aural time difference threshold.

2. The speech enhancement method of claim 1, wherein the sound signal filtering step further includes the steps of:

searching for a plurality of frequency bands whose inter-aural time differences are greater than the first inter-aural time difference threshold; and removing the frequency bands from each frame of the sound signals.

3. The speech enhancement method of claim 2, wherein the sound signal filtering step is implemented by the following formula:

$$\gamma(k_0, m_0) = \begin{cases} 1, & \text{if } |d(k_0, m_0)| \le \tau_1 \\ \eta, & \text{if } |d(k_0, m_0)| > \tau_1, \end{cases}$$

wherein $\gamma(k_0,m_0)$ is a weighting value of frequency band $k_0$ in the frame $m_0$ of the sound signals; $d(k_0,m_0)$ is an inter-aural time difference of frequency band $k_0$ in the frame $m_0$ of the sound signals; $\tau_1$ is the first inter-aural time difference threshold; and $\eta$ is a minimum variable.

4. The speech enhancement method of claim 3, wherein $\eta$ is 0.01.

5. The speech enhancement method of claim 2, wherein the sound signal filtering step is implemented by the following formula:

$$\tau_2 = \tau_1 + \delta + R \times \frac{1}{1 + e^{-\beta(SNR-1)}},$$

wherein $\gamma(k_0,m_0)$ is a weighting value of frequency band $k_0$ in the frame $m_0$ of the sound signals; $d(k_0,m_0)$ is an inter-aural time difference of frequency band $k_0$ in the frame $m_0$ of the sound signals; $\tau_1$ is the first inter-aural time difference threshold; and $\beta$ is a variable to control the filtering degree.

6. The speech enhancement method of claim 1, wherein the first inter-aural time difference threshold determining step further includes the following steps:

calculating a plurality of variances of each inter-aural time difference in accordance with the values of a cumulative histogram;

and determining the inter-aural time difference having a maximum variance to be the first inter-aural time difference threshold.

7. The speech enhancement method of claim 6, wherein the variance calculating step further includes a step of calculating an updated variance in a recurrence calculation based on the previous variance.

8. A speech enhancement method, comprising the following steps:

utilizing a two-microphone set of a microphone array to receive a plurality of frames of sound signals;

calculating an inter-aural time difference for each frequency band of each frame of the sound signals in accordance with the two-microphone set of the microphone array;

calculating a plurality of values of a cumulative histogram and a histogram in accordance with the calculated inter-aural time differences, wherein each value of the cumulative histogram is associated with a sound signal intensity of a respective frame dependent on the inter-aural time difference of that frame, wherein variances in the cumulative histogram are calculated in accordance with different inter-aural time differences of the frames in the cumulative histogram;

determining a first inter-aural time difference threshold in accordance with the values of the cumulative histogram, wherein the first inter-aural time difference threshold is determined in accordance with a maximum of the variances;

determining a second inter-aural time difference threshold in accordance with the values of the histogram and the first inter-aural time difference threshold; and filtering the frames of the sound signals in accordance with the first inter-aural time difference threshold and the second inter-aural time difference threshold;

wherein the second inter-aural time difference threshold is greater than the first inter-aural time difference threshold.

9. The speech enhancement method of claim 8, wherein the sound signal filtering step further includes the steps of:

searching for a plurality of frequency bands whose inter-aural time differences are greater than the second inter-aural time difference threshold;

removing the frequency bands whose inter-aural time difference is greater than the second inter-aural time difference threshold;

searching for a plurality of frequency bands whose inter-aural time differences are between the second inter-aural time difference threshold and the first inter-aural time difference threshold; and attenuating the frequency bands whose inter-aural time difference is between the second inter-aural time difference threshold and the first inter-aural time difference threshold.

10. The speech enhancement method of claim 9, wherein the frequency band removing step and the frequency band attenuating step are implemented by the following formula:

$$\gamma(k_0, m_0) = \begin{cases} 1, & \text{if } |d(k_0, m_0)| \le \tau_1 \\ \alpha, & \text{if } |d(k_0, m_0)| > \tau_1 \text{ and } |d(k_0, m_0)| \le \tau_2 \\ \eta, & \text{otherwise,} \end{cases}$$

wherein $\gamma(k_0,m_0)$ is a weighting value of frequency band $k_0$ in the frame $m_0$ of the sound signals; $d(k_0,m_0)$ is an inter-aural time difference of frequency band $k_0$ in the frame $m_0$ of the sound signals; $\tau_1$ is the first inter-aural time difference threshold; $\tau_2$ is the second inter-aural time difference threshold; $\alpha$ is a variable between 0 and 1 to control the filtering degree; and $\eta$ is a minimum variable.

11. The speech enhancement method of claim 10, wherein $\eta$ is 0.01.

12. The speech enhancement method of claim 10, wherein $\alpha$ and the signal to noise ratio between the voice source and the noise source are in direct proportion.

13. The speech enhancement method of claim 12, wherein the signal to noise ratio is a ratio between a value of the voice source and a value of the noise source based on the values of the histogram.

14. The speech enhancement method of claim 12, wherein $\alpha$ is calculated by the following formula:

$$\alpha = \frac{1}{1 + e^{-\beta(SNR-1)}},$$

wherein SNR is the signal to noise ratio between the voice source and the noise source; and $\beta$ is a variable to control the filtering degree.

15. The speech enhancement method of claim 8, wherein the second inter-aural time difference threshold calculating step further includes the following steps:

calculating a signal to noise ratio of a voice source and a noise source in accordance with the values of the histogram; and determining the second inter-aural time difference threshold in accordance with the signal to noise ratio of a voice source and a noise source, the inter-aural time difference of the noise source, and the first inter-aural time difference.

16. The speech enhancement method of claim 15, wherein the signal to noise ratio is a ratio between a value of the voice source and a value of the noise source based on the values of the histogram.

17. The speech enhancement method of claim 15, wherein the second inter-aural time difference threshold is implemented by the following formula:

$$\tau_2=\tau_1+\delta+R\times\mathrm{SNR},$$

wherein $\tau_1$ is the first inter-aural time difference threshold; $\tau_2$ is the second inter-aural time difference threshold; R means that the inter-aural time difference of the noise source is reduced by subtracting the first inter-aural time difference threshold; SNR is the signal to noise ratio between the voice source and the noise source; and $\delta$ is a minimum angle variable.

18. The speech enhancement method of claim 17, wherein $\delta$ is 0.1.

19. The speech enhancement method of claim 15, wherein the second inter-aural time difference threshold is calculated by the following formula:

$$\tau_2=\tau_1+\delta+R\times\frac{1}{1+e^{-\beta(SNR-1)}},$$

wherein $\tau_1$ is the first inter-aural time difference threshold; $\tau_2$ is the second inter-aural time difference threshold; R means that the inter-aural time difference of the noise source is reduced by subtracting the first inter-aural time difference threshold; SNR is the signal to noise ratio between the voice source and the noise source; $\beta$ is a variable to control the filtering degree; and $\delta$ is a minimum angle variable.

20. The speech enhancement method of claim 19, wherein $\delta$ is 0.1.

21. The speech enhancement method of claim 8, wherein the first inter-aural time difference threshold calculating step further includes the following steps:

calculating a plurality of variances of each inter-aural time difference in accordance with the values of a cumulative histogram; and determining the inter-aural time difference having a maximum variance to be the first inter-aural time difference threshold.

22. The speech enhancement method of claim 21, wherein the variance calculating step further includes a step of calculating an updated variance in a recurrence calculation based on the previous variance.

23. A speech enhancement system, comprising:

a microphone module, having at least one two-microphone set of a microphone array;

an inter-aural time difference calculating module, calculating an inter-aural time difference for each frequency band of each frame of sound signals in accordance with the two-microphone set of the microphone array;

a cumulative histogram module, calculating a plurality of values of a cumulative histogram in accordance with an inter-aural time difference of each frame, wherein each value of the cumulative histogram is associated with a sound signal intensity of a respective frame dependent on the inter-aural time difference of that frame, wherein variances in the cumulative histogram are calculated in accordance with different inter-aural time differences of the frames in the cumulative histogram;

a first inter-aural time difference threshold calculating module, calculating the first inter-aural time difference threshold in accordance with the values of the cumulative histogram, wherein the first inter-aural time difference threshold is determined in accordance with a maximum of the variances; and a sound signal filtering module, filtering the sound signals in accordance with the first inter-aural time difference threshold.

24. A speech enhancement system comprising:

a microphone module, having at least one two-microphone set of a microphone array;

an inter-aural time difference calculating module, calculating an inter-aural time difference for each frequency band of each frame of sound signals in accordance with the two-microphone set of the microphone array;

a cumulative histogram module, calculating a plurality of values of a cumulative histogram and a histogram in accordance with an inter-aural time difference for each frame, wherein each value of the cumulative histogram is associated with a sound signal intensity of a respective frame dependent on the inter-aural time difference of that frame, wherein variances in the cumulative histogram are calculated in accordance with different inter-aural time differences of the frames in the cumulative histogram;

a first inter-aural time difference threshold calculating module, determining the first inter-aural time difference threshold in accordance with the values of the cumulative histogram, wherein the first inter-aural time difference threshold is determined in accordance with a maximum of the variances;

a second inter-aural time difference threshold calculating module, determining the second inter-aural time difference threshold in accordance with the values of the histogram and the first inter-aural time difference threshold; and a sound signal filtering module, filtering the sound signals in accordance with the first inter-aural time difference threshold and the second inter-aural time difference threshold.

25. A speech enhancement method, comprising the following steps:

utilizing a microphone array to receive a plurality of frames of sound signals, wherein the microphone array includes a plurality of microphones;

calculating an inter-aural time difference for each frequency band of each frame of the sound signals in accordance with at least one two-microphone set of the microphone array;

calculating a plurality of values of a cumulative histogram and a histogram in accordance with the calculated inter-aural time differences, wherein each value of the cumulative histogram is associated with a sound signal intensity of a respective frame dependent in the inter-aural time difference of that frame, wherein variances in the cumulative histogram are calculated in accordance with different inter-aural time differences of the frames in the cumulative histogram;

determining a first inter-aural time difference threshold in accordance with the values of the cumulative histogram, wherein the first inter-aural time difference threshold is determined in accordance with a maximum of variances;

determining a second inter-aural time difference threshold in accordance with the values of the histogram and the first inter-aural time difference threshold;

filtering the frames of the sound signals in accordance with the first inter-aural time difference threshold and the second inter-aural time difference threshold and obtaining at least one speech enhancement signal, wherein the second inter-aural time difference threshold is greater than the first inter-aural time difference threshold; and weighting at least one of the speech enhancement signals to obtain a weighted speech enhancement signal.

26. A speech enhancement system, comprising:

a microphone module, having a plurality of microphones;

an inter-aural time difference calculating module, calculating an inter-aural time difference for each frequency band of each frame of sound signals in accordance with at least one two-microphone set of a plurality of microphones;

a cumulative histogram module, calculating a plurality of values of a cumulative histogram and a histogram in accordance with an inter-aural time difference for each frame, wherein each value of the cumulative histogram is associated with a sound signal intensity of a respective frame dependent on the inter-aural time difference of that frame, wherein variances in the cumulative histogram are calculated in accordance with different inter-aural time differences of the frames in the cumulative histogram;

a first inter-aural time difference threshold calculating module, determining the first inter-aural time difference threshold in accordance with the values of the cumulative histogram, wherein the first inter-aural time difference threshold is determined in accordance with a maximum of the variances;

a second inter-aural time difference threshold calculating module, determining the second inter-aural time difference threshold in accordance with the values of the histogram and the first inter-aural time difference threshold;

a sound signal filtering module, filtering the sound signals in accordance with the first inter-aural time difference threshold and the second inter-aural time difference threshold to generate at least one speech enhancement signal; and a weighting module, predetermining at least one weighting value and weighting at least one speech enhancement signal to obtain a weighted speech enhancement signal.

* * * * *